(12) United States Patent
Kirchner et al.

(10) Patent No.: US 10,427,505 B2
(45) Date of Patent: Oct. 1, 2019

(54) ROOF MODULE FOR A VEHICLE AND METHOD FOR MANUFACTURING A ROOF MODULE

(71) Applicant: Roof Systems Germany GmbH, Dietzenbach (DE)

(72) Inventors: Maximilian Kirchner, Schluechtern (DE); Matthias Ludwig, Vechelde (DE); Joachim Röder, Muehlheim (DE); Markus Waroch, Gifhorn (DE)

(73) Assignee: ROOF SYSTEMS GERMANY GMBH, Dietzenbach (DE)

( * ) Notice: Subject to any disclaimer, the term of this patent is extended or adjusted under 35 U.S.C. 154(b) by 0 days.

(21) Appl. No.: 15/617,641

(22) Filed: Jun. 8, 2017

(65) Prior Publication Data

US 2017/0355401 A1    Dec. 14, 2017

(30) Foreign Application Priority Data

Jun. 8, 2016    (DE) ........................ 10 2016 110 586

(51) Int. Cl.

| | |
|---|---|
| *B60J 7/00* | (2006.01) |
| *B29C 70/48* | (2006.01) |
| *B62D 25/06* | (2006.01) |
| *B29C 69/02* | (2006.01) |
| *B62D 29/04* | (2006.01) |
| *B29C 70/20* | (2006.01) |
| *B29C 44/32* | (2006.01) |
| *B29C 59/02* | (2006.01) |

(Continued)

(52) U.S. Cl.
CPC ............. *B60J 7/00* (2013.01); *B29C 69/02* (2013.01); *B29C 70/202* (2013.01); *B29C 70/48* (2013.01); *B62D 25/06* (2013.01); *B62D 29/043* (2013.01); *B29C 44/332* (2016.11); *B29C 59/02* (2013.01); *B29K 2075/00* (2013.01); *B29K 2105/256* (2013.01); *B29K 2309/08* (2013.01); *B29L 2031/3002* (2013.01); *B60Y 2410/122* (2013.01)

(58) Field of Classification Search
CPC .................................. B62D 25/06; B60J 7/00
USPC ............................................ 296/210, 216.01
See application file for complete search history.

(56) References Cited

U.S. PATENT DOCUMENTS

| | | | | |
|---|---|---|---|---|
| 5,418,260 A | * | 5/1995 | Smith .................... | C08G 18/10 521/159 |
| 7,862,101 B2 | * | 1/2011 | Lusk .................. | B60R 16/0207 296/178 |

(Continued)

FOREIGN PATENT DOCUMENTS

| | | |
|---|---|---|
| DE | 10229473 A1 | 6/2003 |
| DE | 102007019738 A1 | 10/2008 |

(Continued)

*Primary Examiner* — Dennis H Pedder
(74) *Attorney, Agent, or Firm* — Dilworth IP, LLC

(57) ABSTRACT

A roof module for a motor vehicle comprises an RTM frame and a Class-A covering layer, which at least partially covers the frame and is made of polyurethane. A method for manufacturing a roof module comprises the following steps: Initially, a fiber mat is put into a first mold. Then, a reactive resin system is introduced into the closed mold and the resin cures, so that a blank is formed. The blank is put into a second mold, into which subsequently polyurethane is introduced in the open condition. The polyurethane expands, wherein it at least partially forms a Class-A surface.

11 Claims, 5 Drawing Sheets

(51) Int. Cl.
*B29K 75/00* (2006.01)
*B29K 105/00* (2006.01)
*B29K 309/08* (2006.01)
*B29L 31/30* (2006.01)

(56) References Cited

U.S. PATENT DOCUMENTS

| | | | |
|---|---|---|---|
| 7,972,676 B2 * | 7/2011 | Kleba | B32B 15/095 |
| | | | 156/242 |
| 2003/0134085 A1 | 7/2003 | Haas et al. | |
| 2008/0179772 A1 * | 7/2008 | Dichtl | B29C 33/0038 |
| | | | 264/46.5 |
| 2010/0140984 A1 | 6/2010 | Murray | |
| 2011/0101731 A1 | 5/2011 | Legler et al. | |
| 2011/0262703 A1 | 10/2011 | Legler et al. | |
| 2015/0298373 A1 | 10/2015 | Kiesewetter | |

FOREIGN PATENT DOCUMENTS

| | | |
|---|---|---|
| DE | 102008033923 A1 | 1/2010 |
| DE | 102008035918 A1 | 2/2010 |
| DE | 102012104542 A1 | 11/2013 |
| DE | 102012111350 A1 | 5/2014 |
| GB | 2521937 A | 7/2015 |

\* cited by examiner

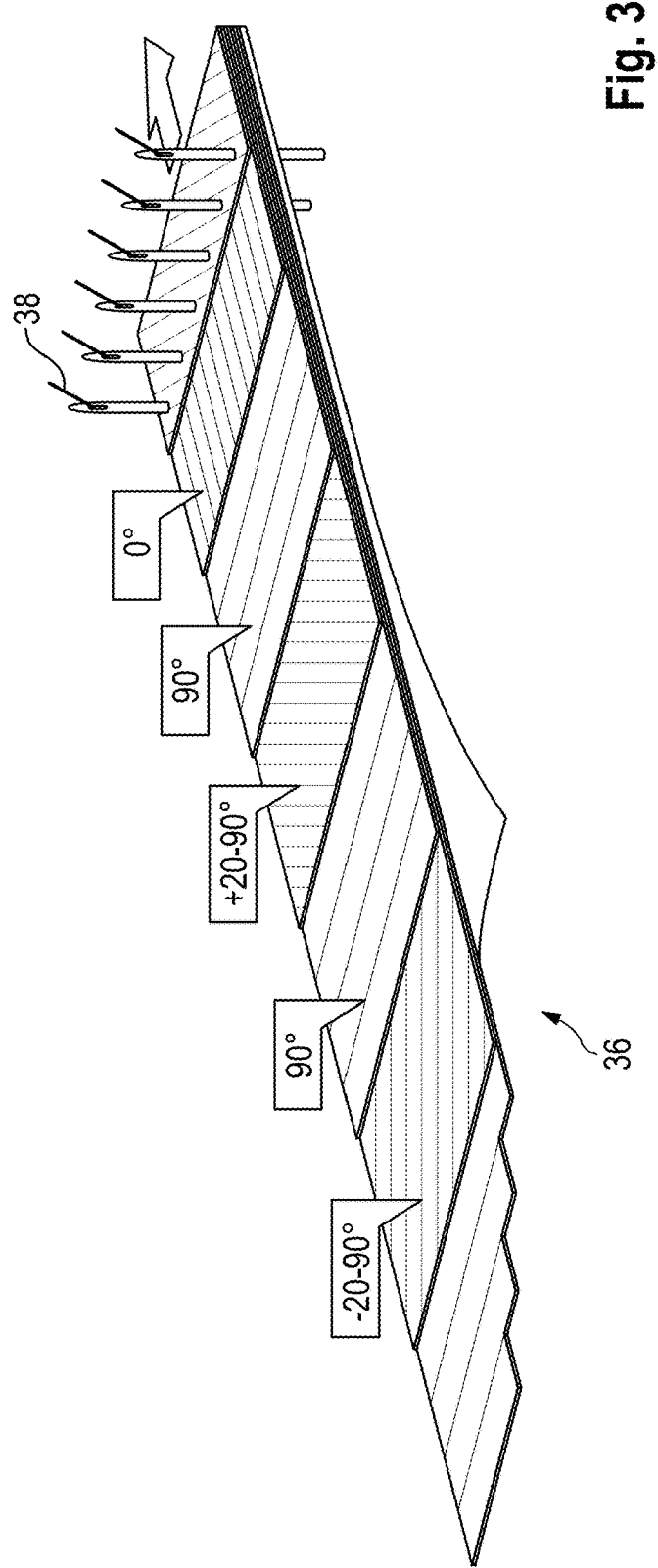

ROOF MODULE FOR A VEHICLE AND METHOD FOR MANUFACTURING A ROOF MODULE

CROSS REFERENCE TO RELATED APPLICATIONS

This application claims priority under 35 U.S.C. 119 to the following German Patent Application No. DE 10 2016 110 586.4 filed on Jun. 8, 2016, the entire contents of which are incorporated herein by reference thereto.

TECHNICAL FIELD

The invention relates to a roof module for a motor vehicle and a method for manufacturing a roof module for a motor vehicle.

BACKGROUND OF THE INVENTION

From the prior art numerous roof modules are known already, which are designed as composite plastic components. Due to their low weight, the simple shape and the better adjustability of the material properties, these composite components frequently replace conventional vehicle roof modules or exterior claddings of vehicle bodies, which are made of glass or sheet metal.

Such roof modules are particularly advantageous when they are supplied as pre-mounted assembly which then is connected with the rest of the bodyshell (i.e. in particular the longitudinal and transverse struts which usually extend between the two A-pillars, the two B-pillars and the two C-pillars).

It is the object of the invention to create a roof module which is characterized by improved properties, i.e. in particular higher strength, lower weight and/or higher-quality surface.

BRIEF DESCRIPTION OF THE INVENTION

This object is achieved with a roof module for a motor vehicle is provided in accordance with the invention, comprising an RTM frame and a Class-A covering layer which at least partially covers the frame and is made of polyurethane. For the solution of this object there is furthermore provided a method for manufacturing a roof module by means of the following steps: Initially, a fiber mat is put into a first mold. Then, a reactive resin system is introduced into the closed mold and the resin cures, so that a blank is formed. The blank is put into a second mold, into which subsequently polyurethane is introduced in the open condition. The polyurethane expands, wherein it at least partially forms a Class-A surface.

The invention is based on the finding that excellent properties can be achieved by the combination of an RTM frame with a foam cladding of polyurethane. On the one hand, the frame is characterized by a high rigidity. On the other hand, in regions which in the mounted roof module are visible from outside a Class-A surface can be obtained with comparatively little effort, without separate attachment parts having to be mounted on the frame for this purpose, as it often is the case in the prior art. This leads to weight advantages. Furthermore, the Class-A surface of polyurethane is of very high quality, as it can be realized with a self-healing surface. If desired, the Class-A surface also can be polished.

The term RTM frame here designates a frame which is manufactured by the so-called RTM method. RTM stands for "Resin Transfer Molding" and also is known by the term "resin injection method". In this method an unimpregnated fiber mat is put into a mold, and after closing of the mold a reactive resin system is introduced into the mold cavity of the mold. The resin system fully soaks the fiber mat and cures. Subsequently, a blank can be removed from the mold.

For the RTM method various reactive resin systems are conceivable. Polyurethane, however, is particularly preferred, as it leads to very good results as regards its properties.

The RTM frame preferably includes a fiber mat which in particular can contain glass fibers. This provides a very high component strength.

The fiber content of the frame lies between 40% and 60%. What is particularly preferred is a glass fiber content of 45%.

The fiber mat preferably is multi-layered. This provides for aligning the fibers in the individual layers corresponding to the component load, whereby the stiffness of the frame is optimized.

According to a preferred embodiment of the invention the fiber mat is free from seams at least in the region of the Class-A covering layer. In principle such seams are advantageous, in order to suitably drape the different layers of the fiber mat. It was found out, however, that the surface quality of the Class-A covering layer is better when the fiber mat is completely free there from seams.

According to one aspect of the invention it is provided that between the RTM frame and the covering layer a film is arranged. The film, which in particular is made of thermoplastic material, acts as thermal insulation and adhesion promoter between the RTM frame and the covering layer, whereby on the one hand the surface qualities of the Class-A covering layer are increased and on the other hand a better connection between the covering layer and the frame is obtained.

To adapt the covering layer to the respective wishes of the customer, it is possible to color the polyurethane introduced into the second mold. Then, it no longer is necessary to paint the finished roof module.

According to one aspect of the invention it is provided that the fiber mat is pre-embossed before it is put into the first mold. It thereby is possible to also realize more complex geometries of the frame, without any problems arising when carrying out the RTM method.

BRIEF DESCRIPTION OF THE DRAWINGS

The invention will be described below with reference to various embodiments which are illustrated in the attached drawings, in which:

FIG. 3 schematically shows a section through a fiber mat which can be used in the manufacture of the blank;

DETAILED DESCRIPTION OF THE INVENTION

Figure 1:
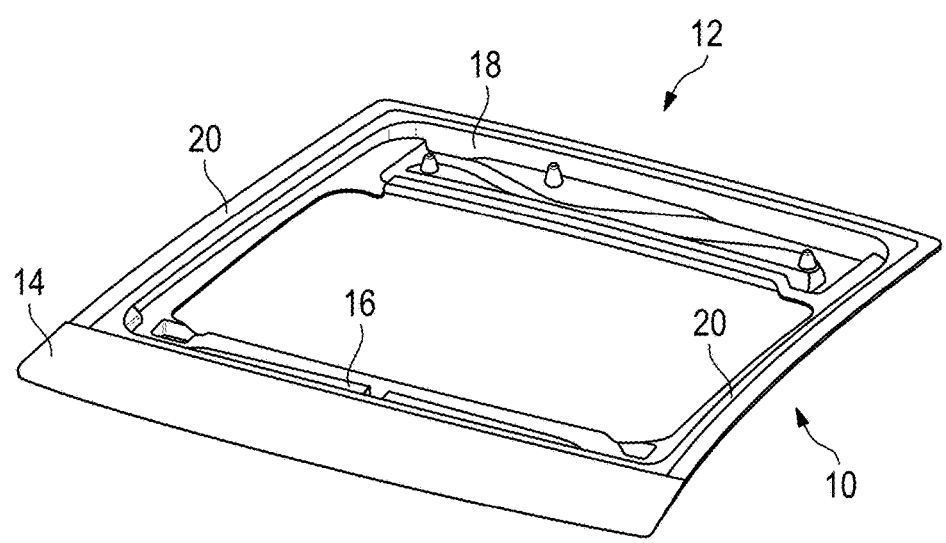
FIG. 1 shows a perspective view of a roof module according to the invention.

FIG. 1 schematically shows a roof module 10 according to a first embodiment. It here consists of an RTM frame 12 which in certain parts or portions is provided with a Class-A covering layer 14.

The roof module 10 is provided to be mounted on a motor vehicle. In particular, it is connected with the bodyshell. Depending on the design of the roof module it can form part of the roof surface of the body or the entire roof surface. The roof module for example can be arranged in the region between the two A-pillars or the two B-pillars.

The frame 12 includes a front transverse strut 16 and a rear transverse strut 18. The same are connected with each other by two side struts 20. All struts are formed integrally with each other.

The struts 16, 18, 20 are suitably profiled, so that a lid (not shown here) can be mounted on the same. The lid in particular can be transparent.

Depending on the embodiment the lid can be firmly connected with the frame 12, in particular be glued to the same. In this case, the struts of the frame 12 are profiled such that the desired connecting surfaces for the lid are produced.

A transparent lid also can be an adjustable lid of a sliding roof system. In this case, the struts 16, 18, 20 are profiled such that the desired fastening points for the mechanism of the sliding roof, the shading device, holders for cable ducts, water channels and/or other assembly configurations are obtained.

In the embodiment shown in FIG. 1, the Class-A covering layer 14 is designed in the manner of a trim which here extends across the entire width of the front strut 16. In the mounted condition of the roof module 10 the Class-A covering layer 14 hence adjoins the upper edge of the windshield of the vehicle.

The Class-A covering layer 14 is no separate component, but directly foamed onto the frame 12. Its surface has a structure which resembles that of a painted sheet-metal surface, so that in principle it can be part of the outer surface of a vehicle body without any further aftertreatment.

Figure 2A:
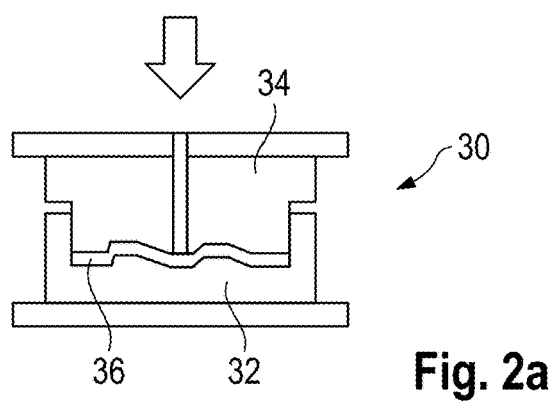
FIGS. 2a to 2c show various method steps in the manufacture of a blank.
Figure 2B:
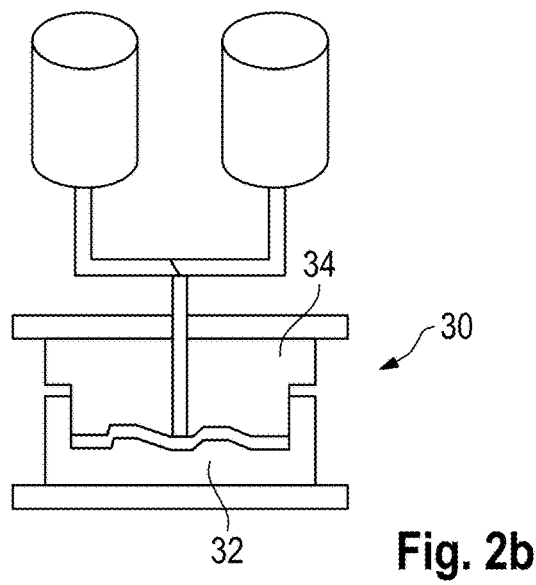
Figure 2C:
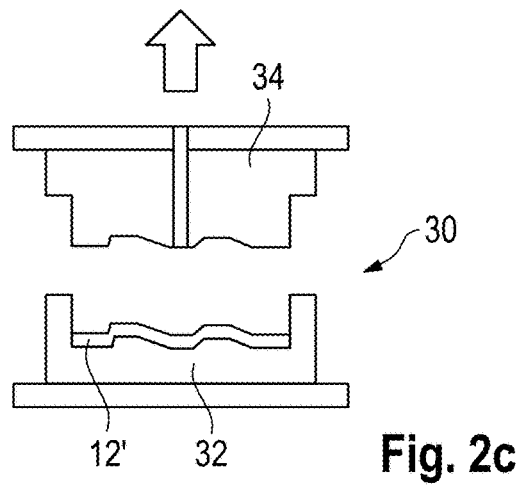

With reference to FIGS. 2a to 2c the manufacture of the frame 12 will be explained below.

For manufacturing the frame 12 a mold 30 is used, which includes two mold parts 32, 34. Between the two mold parts 32, 34 a fiber mat 36 is placed. It is designed multi-layered (see FIG. 3), wherein the fiber direction of the individual layers is adjusted to the future component load. This in particular is a multilayer glass fiber mat.

The fiber mat (also known as "preform") already has the basic geometry of the frame 12. In the exemplary embodiment shown in FIG. 1 the fiber mat 36 hence has a frame-like, rectangular shape with a large central cutout.

When it is put into the first mold 30, the fiber mat 36 usually is pre-embossed, so that its profiling already resembles the profiling of the finished frame 12. In addition, the fiber mat can be provided with a plurality of seams 38 indicated in FIG. 3, which supports draping of the individual fiber layers.

The pre-embossed fiber mat 36, without being impregnated with resin, is placed between the two parts 32, 34 of the mold, and the mold is closed (see FIG. 2a).

Subsequently, a reactive resin system is introduced into the first mold 30 (see FIG. 2b). The reactive resin system preferably is polyisocyanate.

In the mold 30, the resin system impregnates the fiber mat (symbolized in FIG. 2b by a central sprue, from which the resin system spreads in the mold cavity of the mold and thereby impregnates the fiber mat) and cures.

Subsequently, the mold 30 can be opened (see FIG. 2c) and a blank of the frame can be removed.

Figure 4A:
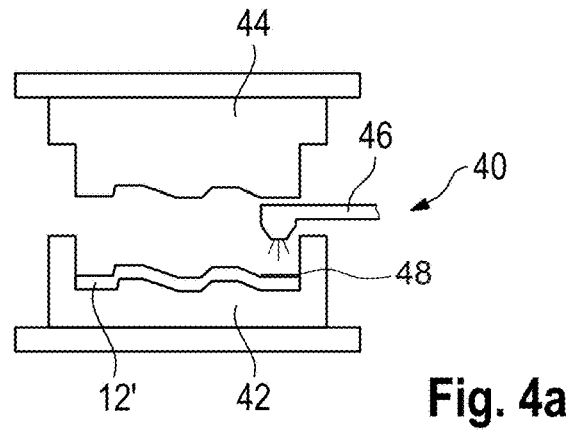
FIGS. 4a to 4c show various steps in the manufacture of the Class-A covering layer.
Figure 4B:
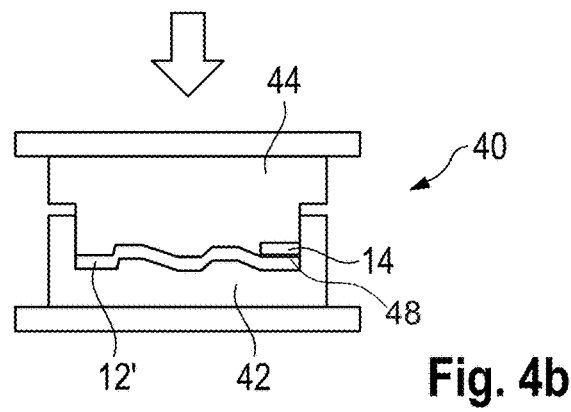
Figure 4C:
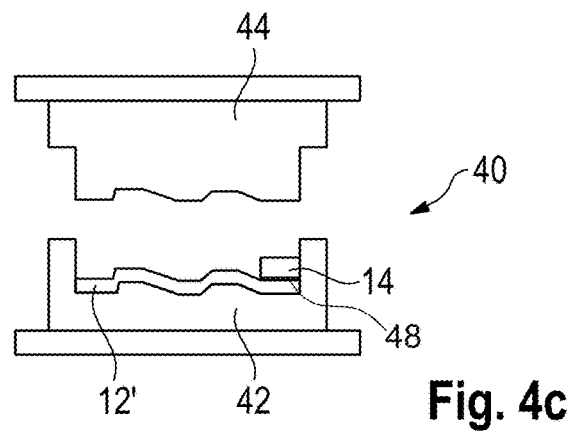

In a second mold 40 the Class-A covering layer 14 is applied onto the blank (see FIGS. 4a to 4c).

The second mold 40 also consists of two parts 42, 44. In contrast to the first mold 30, the second mold 40 has no sprue region.

In a first step the blank 12' is put into the open second mold 40. Subsequently, a reactive resin system is applied onto the region of the blank 12' which is to be provided with the covering layer 14. This is symbolized by a schematically indicated spray head 46. Subsequently, the second mold is closed (see FIG. 4b) and the reactive resin system cures. This is a foaming process which ensures that a smooth mold surface of the second mold present in the region of the covering layer 14 to be produced is impressed as Class-A surface.

According to a design variant illustrated in FIGS. 4a to 4c it can be provided that a film 48 is put into the second mold, which serves as thermal insulation and as adhesion promoter between the blank 12' and the covering layer 14 foamed to the same. The film 48 in particular can be made of thermoplastic material.

Figure 5A:
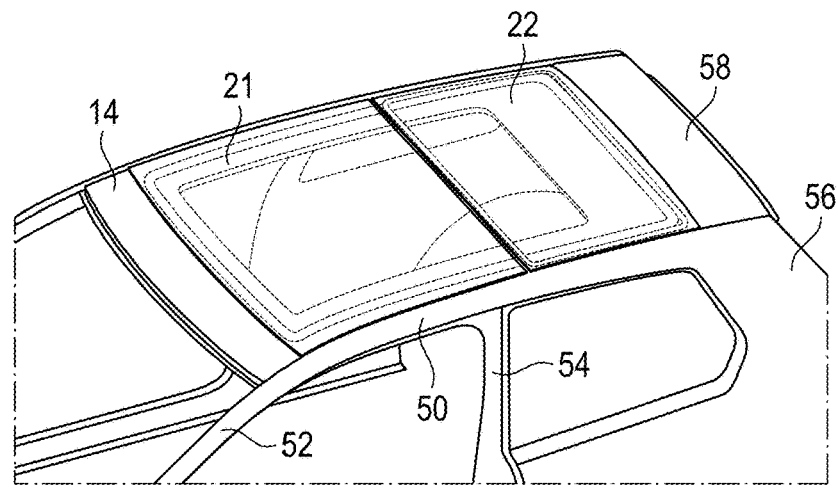
FIGS. 5a to 5c show a roof module according to a second embodiment of the invention in various views.
Figure 5B:
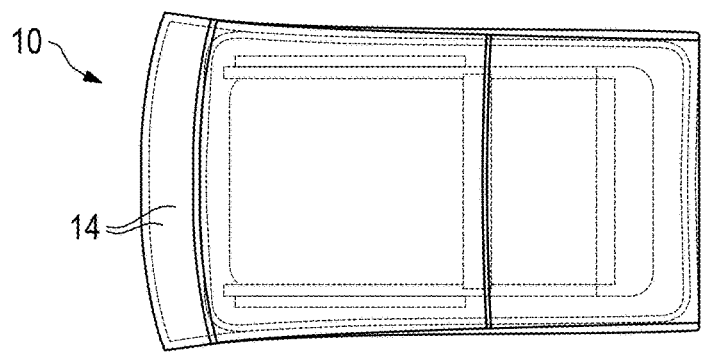
Figure 5C:
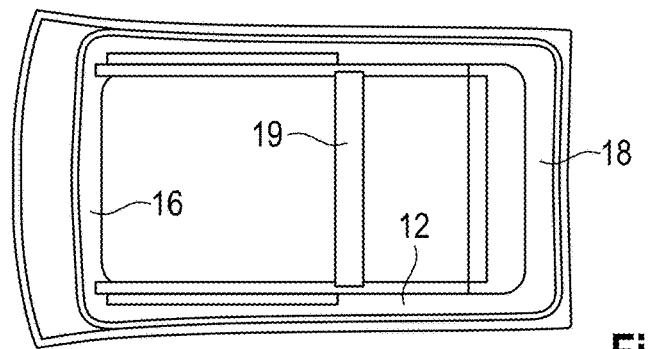

In FIGS. 5a to 5c a second embodiment 10 is shown. It can be seen that the frame 12 is designed very much longer than in the first embodiment. It here extends along longitudinal beams 50 of the bodyshell proceeding from the A-pillar 52, i.e. adjoining the windshield, over the B-pillars 54 into the region between the C-pillars 56. In addition to the front strut 16 and to the rear strut 18 the frame 12 also is provided with a middle strut 19.

On the frame 12 a front lid 21 and a rear lid 22 are mounted. In the illustrated exemplary embodiment the front lid 21 is shiftable in longitudinal direction of the vehicle, while the rear lid 22 is firmly mounted on the frame 12 and hence on the roof module 10.

In principle, the rear lid also can be shiftably mounted.

Before the front lid 21 the frame 12 is provided with a Class-A covering layer 14. Behind the rear transverse strut 18 of the frame a roof surface 58 of the vehicle body is located.

Although in the second embodiment the covering layer 14 only is shown at the front edge, a further covering layer can of course also be present between the rear lid and the roof surface of the vehicle body. It likewise is possible to use a covering layer only at the rear edge of the roof module.

What is claimed is:

1. A sun roof module adapted to be placed in a vehicle body structure of a motor vehicle, the sun roof module including an RTM frame and a Class-A covering layer, which at least partially covers the frame and is made of polyurethane, the Class-A covering layer being fiber-free, wherein the RTM frame includes a fiber mat, and wherein the fiber mat is free from seams at least in the region of the Class A covering layer.

2. The roof module of claim 1 wherein the RTM frame is a polyurethane component.

3. The roof module of claim 1 wherein the fiber mat contains glass fibers.

4. The roof module of claim 3 wherein the glass fiber content of the frame lies between 40% and 60%.

5. The roof module of claim 1 wherein the fiber mat is multi-layered.

6. The roof module of claim 1 wherein between the RTM frame and the covering layer a film is arranged.

7. The roof module of claim 6 wherein the film is made of thermoplastic material.

8. A sun roof module adapted to be placed in a vehicle body structure of a motor vehicle, the sun roof module including an RTM frame and a Class-A covering layer, which at least partially covers the frame and is made of polyurethane, the Class-A covering layer being fiber-free, wherein the RTM frame includes a fiber mat, wherein the fiber mat contains glass fibers, and wherein the glass fiber content of the frame lies between 40% and 60%.

9. The roof module of claim 8 wherein the fiber mat is multi-layered.

10. The roof module of claim 8 wherein between the RTM frame and the covering layer a film is arranged.

11. The roof module of claim 10 wherein the film is made of thermoplastic material.

* * * * *